United States Patent
Cameron et al.

(10) Patent No.: US 7,430,552 B2
(45) Date of Patent: Sep. 30, 2008

(54) COMPUTER BASED SYSTEM AND METHOD OF DETERMINING A SATISFACTION INDEX OF A TEXT

(75) Inventors: Richard Neill Cameron, Le Rouret (FR); Ramon Aragues, Juan les Pins (FR); Michael Baumhackl, Antibes Juan les Pins (FR)

(73) Assignee: Accenture Global Services GmbH, Schaffhausen (CH)

( * ) Notice: Subject to any disclaimer, the term of this patent is extended or adjusted under 35 U.S.C. 154(b) by 380 days.

(21) Appl. No.: 10/344,328

(22) PCT Filed: Jul. 9, 2002

(86) PCT No.: PCT/EP02/08469

§ 371 (c)(1),
(2), (4) Date: Feb. 10, 2003

(87) PCT Pub. No.: WO03/007200

PCT Pub. Date: Jan. 23, 2003

(65) Prior Publication Data

US 2003/0191760 A1 Oct. 9, 2003

(30) Foreign Application Priority Data

Jul. 9, 2001 (EP) .................................. 01410086

(51) Int. Cl.
*G06F 17/30* (2006.01)
(52) U.S. Cl. .............................................. 707/7; 707/6
(58) Field of Classification Search .................. 707/1–7, 707/200–204
See application file for complete search history.

(56) References Cited

U.S. PATENT DOCUMENTS

| 5,717,865 | A | | 2/1998 | Stratmann |
| 5,724,567 | A | | 3/1998 | Rose et al. |
| 5,835,087 | A | | 11/1998 | Herz et al. |
| 5,983,214 | A | | 11/1999 | Lang et al. |
| 5,987,460 | A | * | 11/1999 | Niwa et al. ..................... 707/6 |
| 6,377,947 | B1 | * | 4/2002 | Evans ............................ 707/5 |
| 6,622,140 | B1 | * | 9/2003 | Kantrowitz .................... 707/5 |
| 6,839,681 | B1 | * | 1/2005 | Hotz ........................... 705/10 |

(Continued)

FOREIGN PATENT DOCUMENTS

EP 0 889 419 A3 1/1999

(Continued)

*Primary Examiner*—Don Wong
*Assistant Examiner*—Hanh B Thai
(74) *Attorney, Agent, or Firm*—Brinks Hofer Gilson & Lione

(57) ABSTRACT

The invention relates to a computer based method and system for automatically determining in a document an object satisfaction score (44), choosing at least one of either a positive score or a negative score, comprising the steps of: subdividing the document into windows of words; selecting one of said windows when it contains at least one descriptive property corresponding to a key subject of said object and/or when it does not contain any descriptive property corresponding to an anti-key subject of said object; processing each selected window to determine a positive or negative score of said window by counting the occurrences of positive and negative concepts; and cumulating the scores of the selected windows to obtain said object satisfaction score for the document.

5 Claims, 3 Drawing Sheets

U.S. PATENT DOCUMENTS

| | | | |
|---|---|---|---|
| 6,970,863 B2 * | 11/2005 | Cragun et al. | 707/3 |
| 7,000,178 B2 * | 2/2006 | Unchida et al. | 715/234 |
| 7,328,204 B2 * | 2/2008 | Coady | 707/2 |
| 7,356,604 B1 * | 4/2008 | Roma | 709/231 |
| 2003/0195877 A1 * | 10/2003 | Ford et al. | 707/3 |

FOREIGN PATENT DOCUMENTS

WO 00/04464 1/2000

* cited by examiner

COMPUTER BASED SYSTEM AND METHOD OF DETERMINING A SATISFACTION INDEX OF A TEXT

This application is a 35 U.S.C. §371 filing of International Patent Application No. PCT/EP02/08469, filed Jul. 9, 2002. This application claims priority benefit of European Patent Application No. 01410086.1, filed Jul. 9, 2001.

FIELD OF THE INVENTION

The present invention relates to computer based systems and methods of selecting and analyzing candidate documents containing specific contents or subject matter. More precisely, the invention relates to an automatic system for and method of processing documents to evaluate the global opinion or satisfaction about an object such as a product, a service, a brand, an event or similar. For example, the documents which are found in the World Wide Web.

BACKGROUND

A technical problem exists in evaluating apparent trends in the perception of people regarding products, services, brands, events, etc., in a global community, where many, if not most of, such opinions are found in documents and files available on the Word Wide Web.

There is a need for an automated, computationally efficient, method and system for analyzing this plethora of documents and files, and to efficiently generate information which would indicate perceptions (positive or negative) of people regarding such products and services, by goegraphical or by another similar segmented manner.

For clarity, in the following description, "objects" means products, services, brands, events, etc. that can be identified by words in a document and on which one wants to have a global satisfaction evaluation.

On the web, numerous documents are published each day, and numerous opinions are expressed in different ways, for example, by setting up web pages, by exchanging information in newsgroups and discussing subjects in chat-rooms. These documents contain valuable information about the perception of objects.

Capturing or monitoring the perception of objects on the web or any other network allows evaluating the positive and/or negative (and/or opinionless) perception of the users/customers. More generally, perception analysis allows a corporation, institution or the like to know the opinion of actual or potential users/customers on their products, services, etc. This satisfaction opinion can then be used for modifying/improving the object.

Known evaluation methods providing satisfaction indexes use document search engines to perform keyword searches for publications on the web. Such search engines are able to find on the web all documents containing one or more keywords and to download documents related to a specific topic. Then, the examination and evaluation of the satisfaction index (positive, negative, opinionless) of each document are either done manually, i.e. by readers extracting the global impression of the document, or automatically with artificial neural networks which are very complex, especially to configure for a new domain. The complexity of the neural networks analysis is prejudicial to the speed of processing a voluminous data base taking into account the configuration time.

An approach which comes in mind to one who will attempt to automatically evaluate a satisfaction index is to use a classification algorithm. Such a classification algorithm consists in a statistical text learning algorithm which can be trained to approximately classify documents, given a sufficient set of labeled training examples. Classification algorithms are already used to automatically catalog news articles, sort e-mail or learn the reading interest of users, and one might think that such algorithms could be trained to distinguish between positive and negative documents. However, not only they require a large, often prohibitive, number of labeled documents (i.e. hand classified) but they do not adapt well to understanding the context of specific words (for example positive references to a given product).

A purpose of the present invention is to overcome at least one disadvantage of the known solutions for automatically determining a satisfaction index about an object.

Another purpose of the present invention is to provide a computer based apparatus and method of selecting and analyzing candidate documents in order to determine a satisfaction index about a predetermined object, which leads to a very simple and fast software algorithm.

A further purpose of the present invention is to make a discrimination between appreciation and description of the object.

BRIEF SUMMARY OF THE INVENTION

To attain the above purposes and others, the present invention provides a computer based method for automatically determining in a document an object satisfaction score, choosing at least one of either a positive score or a negative score, of an object such as a product, service, brand, event or similar, comprising the steps of:

subdividing the document into windows of words;

selecting one of said windows when it contains at least one descriptive property corresponding to a key subject of said object and/or when it does not contain any descriptive property corresponding to an anti-key subject of said object;

processing each selected window to determine a positive or negative score of said window by counting the occurrences of positive and negative concepts; and cumulating the scores of the selected windows to obtain said object satisfaction score for the document.

According to an embodiment of the present invention, the method further comprises the steps of:

storing in a computer memory a list of positive concepts concerning said object;

storing in said computer memory a list of negative concepts concerning said object;

storing in said computer memory a list of descriptive properties corresponding to key subjects of said object; and storing in said computer memory a list of descriptive properties corresponding to anti-key subjects of said object.

According to an embodiment of the present invention, the method further comprises the steps of:

counting the number of occurrences of negation particles in the current selected window; and inverting the positive and negative scores of the current window if said number is odd.

According to an embodiment of the present invention, said windows of words are sentences or segments of sentence.

According to an embodiment of the present invention, the positive or negative score of a previous sentence is subtracted from the document corresponding score when a word considered as a sentence separator and able to constitute a negator of the previous sentence appears in the current sentence.

According to an embodiment of the present invention, the method also comprises the step of storing in said computer memory a list of previous negators.

The present invention also provides a computer based method for automatically determining an object satisfaction index of an object such as a product, service, brand, event or similar, among documents contained in at least one local or remote memory storage comprising the steps of:

selecting from the memory storage documents relating to said object;

processing the selected documents to determine their object satisfaction scores; and cumulating the scores of the selected documents and deducing from obtained cumulated scores said object satisfaction index.

According to an embodiment of the present invention, the selection of a document is based on the occurrences of said key subjects and/or anti-key subjects counted during said processing step of each window.

According to an embodiment of the present invention, a document score is added to the corresponding cumulated score only if the absolute value of the difference between the positive and negative scores of this document is higher than a predetermined satisfaction threshold, or is otherwise considered as opinionless.

According to an embodiment of the present invention, the method further comprises counting the number of occurrences of competitor subjects in each document and wherein a document score is added to the corresponding cumulated score only if said number of competitor subject occurrences is lower than a predetermined comparison threshold.

According to an embodiment of the present invention, the competitor subjects are part of the anti-key subjects and are counted during said processing step of each selected window.

The present invention also provides a computer based system for automatically determining an object satisfaction index for an object such as a product, service, brand, event or similar comprising:

a general purpose computer having at least an output device, at least an input device, at least a communication device for communicating with at least one local and/or remote document memory storage, and a central processing unit, said central processing unit comprising:

at least a computer memory for storing at least a first list of positive concepts concerning said object, a second list of negative concepts concerning said object, and a third list of descriptive properties of said object, a counter for counting, in windows of words of a selected document, the occurrences of positive and/or negative concepts, for cumulating the scores of said windows to obtain a satisfaction score of said object in the document, a window being taken into account in said satisfaction score only if it contains at least one descriptive property corresponding to a key subject of said object and/or if it does not contain any descriptive property corresponding to an anti-key subject of said object.

According to an embodiment of the present invention, said counter cumulates the satisfaction scores of selected documents of the memory storage to determine a satisfaction index of said object.

According to an embodiment of the present invention, the system further comprises a search engine for selecting documents on the basis of said descriptive properties.

According to an embodiment of the present invention, said counter also counts the occurrences of said descriptive properties.

According to an embodiment of the present invention, the system further comprises a data table to store configuration choices.

According to an embodiment of the present invention, the system further comprises a list of previous negators so that, when such a previous negator appears in a current window, the positive or negative score of the previous window is disregarded.

According to an embodiment of the present invention, the system further comprises tools to review the objects description properties and/or the positive and negative concepts and/or the document satisfaction scores, and/or the base document or meta data.

The present invention also provides an automatic system for determining a satisfaction index of an object such as a product, service, brand, event or similar, among a group of documents contained in at least one local or remote memory storage.

The present invention also provides a computer program product.

DESCRIPTION OF THE DRAWINGS

These purposes, features and advantages of preferred, non-limiting, embodiments of the present invention will be described by way of examples with reference to the accompanying drawings, in which.

Figure 1:
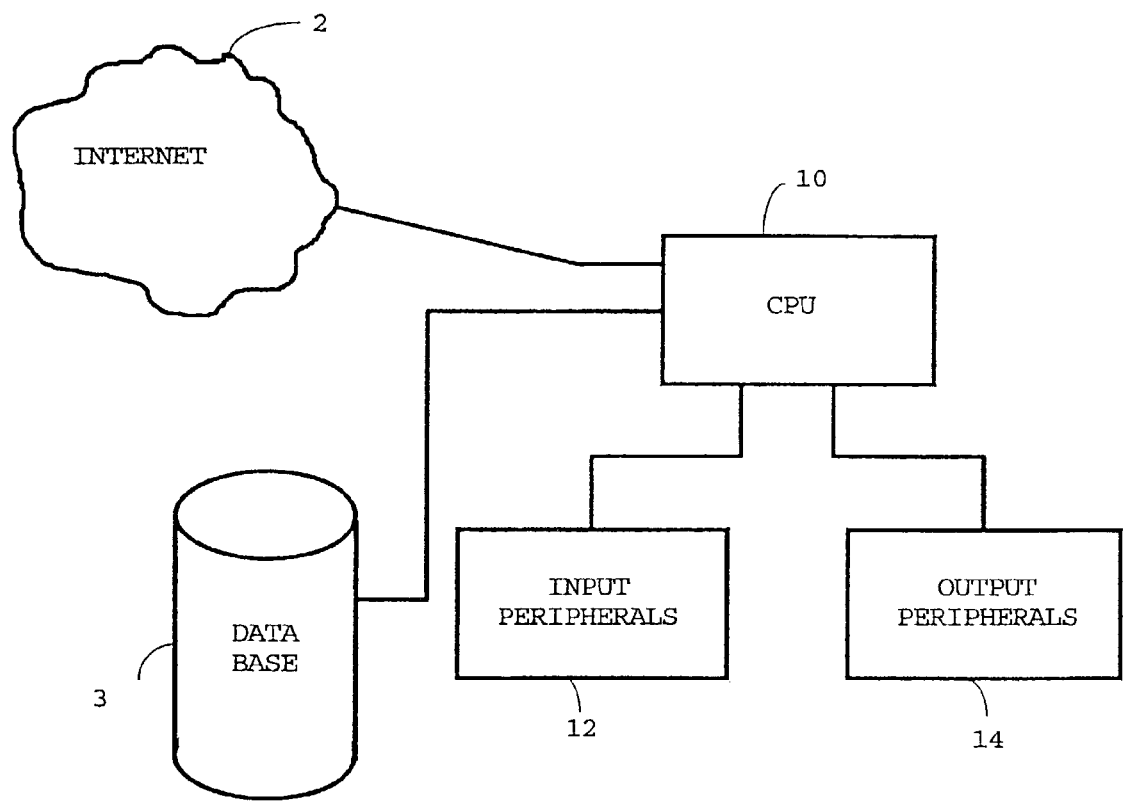
FIG. 1 schematically represents the main elements of one exemplary embodiment of the system according the present invention.

For clarity, only those elements and steps useful to the understanding of the invention have been shown in the drawings. Especially, details of the programming steps according to the system of the invention will not be detailed as it will readily occur to those skilled in the art.

DETAILED DESCRIPTION

In the present specification:

"Subjects" means words or groups of words constituting descriptive properties of the object to be analyzed, i.e. able to select (and differentiate) the concerned object from the others; for example, applied to a product, the subjects may comprise the trade name of the product (eventually associated with the name of the manufacturer for a generic name) and its abbreviations if any, and the trade name of the manufacturer or seller and its trademarks or abbreviations if any; according to the present invention, the subjects are classified into "key subjects" and "anti-key subjects", that is subjects identifying positively the object for which one should evaluate a satisfaction index and subjects which should be excluded for further evaluation; and "Concepts" means words or groups of words constituting an appreciation of an object and which could be classified into positive or negative opinions.

With reference to FIG. 1, one exemplary embodiment of a satisfaction index determination system according to the principles of the present invention includes a general purpose computer (i.e. a general purpose personal computer, or networked server or minicomputer) having a central processing unit 10 (CPU) and including counter(s) and storage memories. The system also comprises standard input peripherals 12-INPUT PERIPHERALS (such as a keyboard, a mouse, a scanner, a floppy disk and/or CD reader, etc.) and standard output peripherals 14-OUTPUT PERIPHERALS (such as a screen, a printer, etc.). The system further includes a data base 3-DATA BASE (or any memory storage element) for receiving and storing, inter alia, text documents to be processed. These documents are, in the exemplary embodiment of FIG. 1, downloaded from the web 2 (INTERNET). The computer also comprises a communication device for communicating with the memory storage(s) (for example, the data base) which could be local or remote.

The texts or documents to be processed according to the present invention may have been selected and stored (for example, downloaded from the web) before the satisfaction index determination processing. Alternatively, the determination processing may be processed on-line, the web being then considered as a remote memory storage. Any intermediate embodiment may be considered.

According to the present invention, the documents to be processed are selected on the basis of descriptive properties of the object (product, service, brand, event, etc.) for which one wants to evaluate an satisfaction index. The descriptive properties are words or group of words identifying the object, so that when such a word or group of words appears in a text, the text has to be considered for its document satisfaction index according to the invention. In the preferred embodiment of the present invention the descriptive properties are classified into key subjects (key words or groups of words) and anti-key subjects (anti-key words or group of words).

The invention may use any classical keyword search provided that, for the preferred embodiment, it also includes an anti-keyword functionality to preferably exclude some sentences to be evaluated in the processed documents. Conventionally, the keyword search tool performs the search on the basis of words identifying the object (i.e. the name(s) of the object and its synonyms).

According to the present invention, the documents are subdivided into windows of words. Preferably, a window corresponds to a sentence or a segment of sentence. The documents are then processed sentence after sentence for evaluating the number of occurrences of positive or negative concepts determining the score of a sentence, that is a positive or negative opinion. Further, the score of a sentence is taken into account in the score of the document corresponding to the number of occurrences of positive or negative sentences only if the sentence refers to a key subject and/or does not refer to an anti-key subject.

The data base 3 also contains the tables (lists) used by the method for determining a satisfaction index according to the invention.

Figure 2:
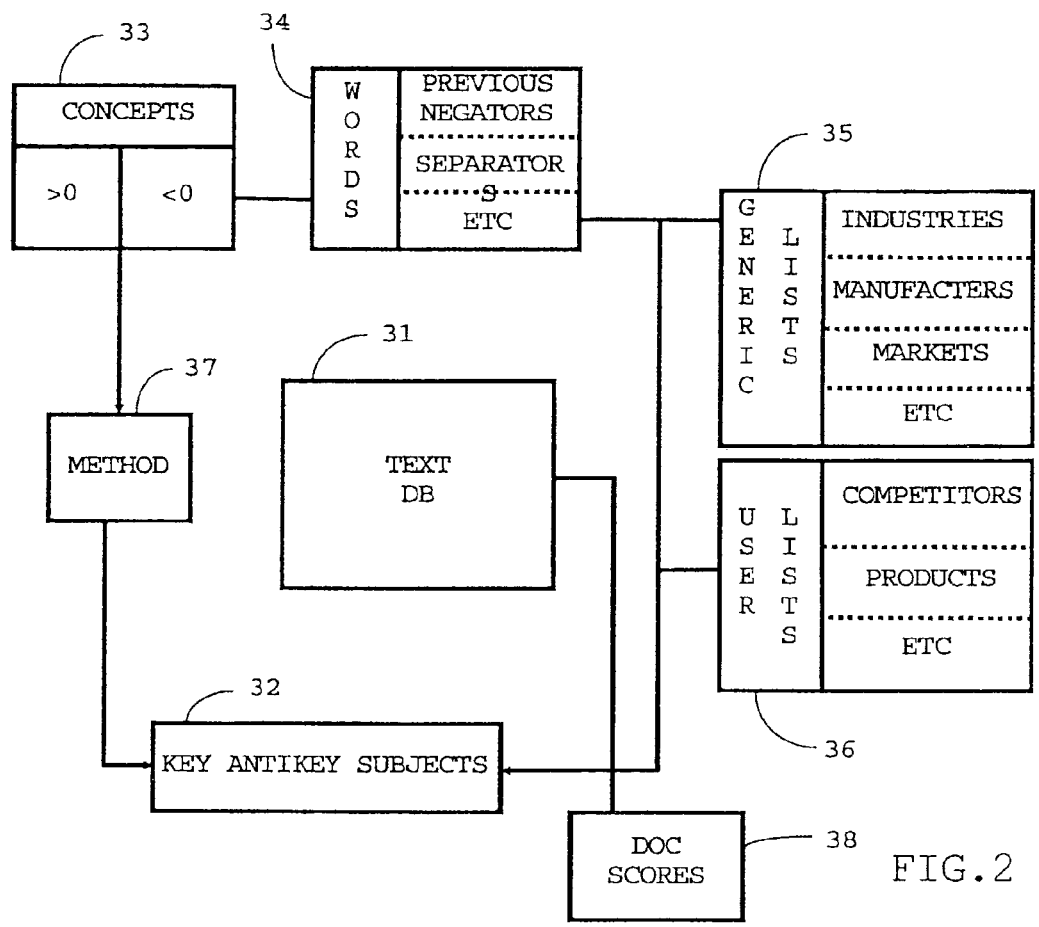
FIG. 2 schematically represents the main data base tables of the system according to one exemplary embodiment of the present invention.

FIG. 2 shows, very schematically, an example of architecture of tables stored in the data base and/or in the computer memory according to a preferred embodiment of the present invention. The tables are symbolized by blocks. The data base contains:
- a table 31 (TEXT DB) containing the texts to be processed;
- a table 32 of key subjects and/or anti-key subjects (KEY-ANTIKEY SUBJECTS) containing lists of descriptive properties of the object for which one wants to obtain a satisfaction index according to the invention (table 32 contains for example, names identifying the objects and their synonyms and eventually the competitors); and
- a concept table 33 (CONCEPTS) listing at least positive (>0) and negative (<0) concepts relating to the object to be analyzed.

In the preferred embodiment of FIG. 2, the data base 3 also contains, in particular, one or more of the following tables:
- a table 34 (WORDS) containing lists of specific words, expressions or signs to optimize the analysis of each document (especially, a list of previous negators (PREVIOUS NEGATORS) and a list of sentence separators (SEPARATORS) and punctuation signs, etc.); a previous (sentence) negator is a word which inverts the satisfaction opinion of a previous sentence or segment of sentence. For example, the word "but" in the sentences "Hamburger are great. But hot-dogs are better" or in the sentence "Hamburgers are great but worse than hot-dogs" inverts the evaluation of the hamburgers in the first sentence or in the first segment;
- a table 35 of generic lists (GENERIC LISTS) containing words or expressions relating to the activity domain (for example, the industries (INDUSTRIES), the manufacturers (MANUFACTURERS), the markets (MARKETS), etc.); these lists may also adapt the sense of a word according to the activity domain;
- a table 36 of user lists (USER LISTS) containing lists dedicated to the users of the system (for example, lists of competitors (COMPETITORS), products (PRODUCTS), etc.) and which, most often, specializes the generic lists;
- a method table 37 (METHOD) containing the different options for processing the documents (for example, selection of sentences by keywords or exclusion by anti-keywords); and
- an index table 38 (DOC. SCORES) storing the document satisfaction scores of each processed document (object satisfaction score or index for a document corresponding to the number of occurrences of positive or negative concepts) for various purposes (for example, to perform a manual detailed analysis of some documents to determine the reasons of a negative judgment on an object).

In FIG. 2, the main functional relations between the different tables are indicated. This corresponds only to an example and the relations or links between the different tables of a data base according to the invention depend on the choices (programming) made for implementing the invention. For example, the list of competitors may be considered as a partial or an additional list of anti-key subjects. Those skilled in these arts will recognize that additional tables or different tables may be used to accomplish the purposes of the invention.

The system of the present invention also comprises tools to review the objects description properties and/or the positive and negative concepts and/or the document satisfaction scores. Such tools allow collecting information about the processed documents and meta data associated to them, and adapting the system to a particular field of use.

Figure 3:
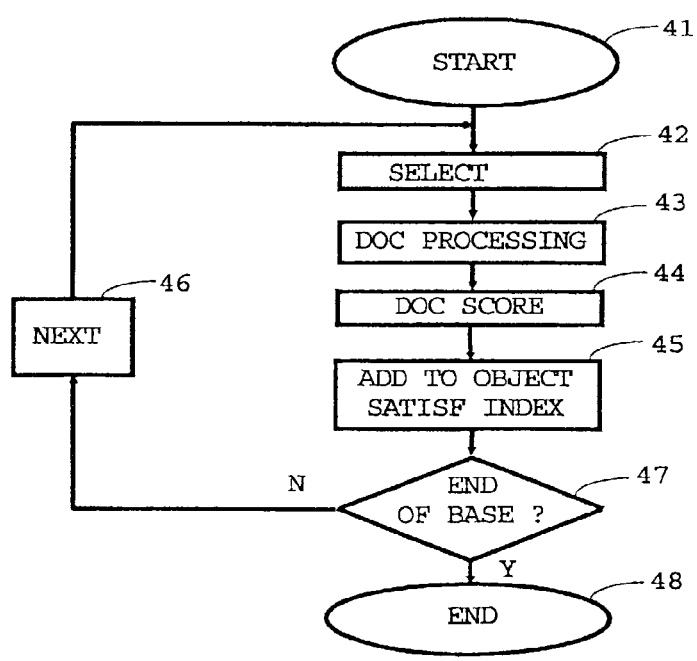
FIG. 3 is a flowchart of the main steps of one exemplary embodiment of the method according to the present invention.

FIG. 3 is a flowchart of the main steps of the method according to an exemplary embodiment of the present invention.

At block 41 (START), the system is initialized and configured according to the processing method selected. According to the present invention, at least one of the following configuration choices can be made:

Selecting the kind of sentences to be taken into account for determining the score of the document. One can either take into account only the sentences containing one occurrence or more of at least one of the key subjects, or only the sentences not containing any anti-key subject, or only the sentences containing at least one occurrence or more of one of the key subjects without containing any anti-key subject. For example, if the object is a car of a manufacturer X, the words "car" and "X" may be key-subjects, and the words "plane" and "Y" (a competitor) may be anti-key subjects. Supposing the text: "The cars manufactured by X are good. The planes manufactured by X are good. The cars manufactured by X and customized by Y are bad. The plane manufactured by Y are good. The bicycles manufactured by Z are good." According to the method selecting only the sentences containing key subjects, only the first three sentences will be selected. According to the method selecting only the sentences not containing an anti-key subject, only the first two and last sentences will be selected. According to the method combining key and anti-key subjects, only the first sentence will be selected.

Determining a comparison threshold, that is a threshold of number of occurrences of competitors from which a document is considered as referring to another object. It is used, for example, to eliminate a document relating to the product of a competitor and in which the object to be evaluated is cited as being compared to one of a competitor. With the foregoing example, the document will be taken into account if the threshold is higher than 2.

Determining a satisfaction threshold in order to consider as opinionless a document in which the difference (in absolute value) between the numbers of occurrences of positive and negative concepts is too low. For example, the satisfaction threshold can be 2. Thus, if a document contains 8 positive sentences and 7 negative sentences, it will be considered as opinionless.

Selecting whether the negation particles are to be processed only with respect to the current sentence or also as an eventual previous negator.

At block 42 (SELECT DOC.), the documents (texts) contained in the data base (table 31, FIG. 2) to be processed are sequentially selected on the basis of the occurrence of a key subject.

The selected documents are sequentially processed (block 43, DOC. PROCESSING) to determine the document score. Step 43 results in a document score (DOC. SCORE) which is stored at block 44.

The document scores are summed in block 45 (ADD TO OBJECT SATISF. INDEX) to provide an object score which results in the object satisfaction index. According to a preferred embodiment, the corresponding document is stored with its satisfaction index.

Then, if all the documents have not yet been processed (block 47, END OF BASE?), the next document is selected (block 46, NEXT) and processed. When all the documents have been processed, results are outputted (block 48, END), for example, in the form of graphics displayed or printed. Various kinds of graphic presentations could be provided depending on the information wanted by the user. The presentations of the processed information are within the ability of those skilled in the art. In particular, intermediate presentations can be displayed during processing.

Figure 4:
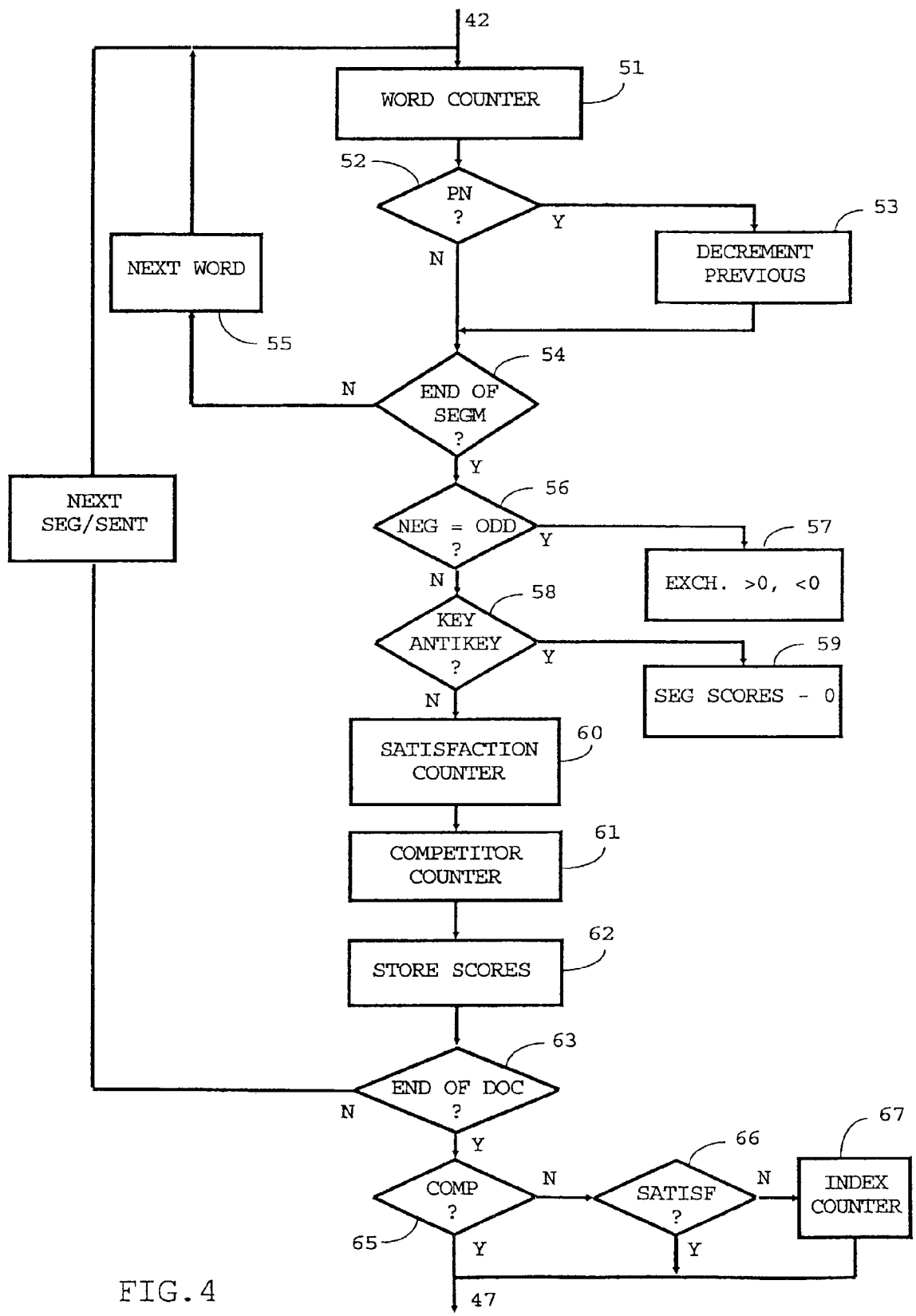
FIG. 4 is a more detailed flowchart of the steps of processing a document according to the present invention.

FIG. 4 shows a more detailed flowchart of steps 43 to 45 of the preferred embodiment of the present invention. For clarity, the corresponding algorithm will be described considering that subjects and concepts are only words. However, in practice, subjects and concepts may be groups of words and the adjustments of the algorithm are in the ability of those skilled in the art.

Each selected document (block 42, FIG. 3) is processed, sentence by sentence. Preferably, the documents are processed at the same time on the basis of both key subjects (and/or anti-key subjects) and positive/negative (or neutral) concepts.

While the words belong to the same sentence or segment of sentence (no punctuation, conjunction, or special character as defined in table 34), the following detections and counts (block 51, WORD COUNTER) are sequentially performed for each word of the sentence:

counting the number of occurrences of positive concepts (good, best, useful, pleasant, etc.) in the sentence, that is sequentially incrementing a positive score of the sentence when the current word is a positive concept;

counting the number of occurrences of negative concepts (bad, worst, useless, unpleasant, etc.) in the sentence, that is sequentially incrementing a negative score of the sentence when the current word is a negative concept;

counting the number of occurrences of key words in the sentence;

counting the number of occurrences of anti-key words in the sentence;

counting the number of occurrences of competitor words in the sentence (the number of competitor words may correspond to the number of anti-key words but has to be cumulated along the whole document); and counting the number of negators (negation particles) in the sentence.

If the first word of a new sentence or segment of sentence (block 52, PN?) is a previous negator ("but", "however", etc.), then the previous sentence has to be ignored. In practice it is sufficient to store the score of a sentence up to the processing of the following one and to, if necessary, decrement the score of the document of the previous sentence score (block 53, DECREMENT PREVIOUS).

At the end of the sentence or segment tested at block 54 (END OF SEGM?) the system decides whether or not there is a next word (block 55, NEXT WORD) to process in step 51. If not, then one processes the following tests and counts:

if the number of negation is an odd value (block 56, NEG=ODD?), then one exchanges the values of the positive and negative scores of the sentence (block 57, EXCH.>0, <0);

if the number of key words is equal to 0 or if the number of anti-key words is not equal to 0 (block 58, KEY ANTI-KEY?), then the negative and positive scores of the sentence are both forced to 0 (block 59, SEG-SCORES=0); if not, at block 60 (SATISFACTION COUNTER), if the positive score of the sentence is higher than its negative score, then one increments by 1 the positive score of the document, else if the negative score of the sentence is higher than its positive score, one increments by 1 the negative score of the document, else the sentence is considered as opinionless;

adding (block 61, COMPETITOR COUNTER.) the number of occurrences of competitors in the sentence to the total number of competitors;

storing (block 62, STORE SCORES) the opinion (positive, negative or opinionless) of the current sentence as being the opinion if the previous sentence (for the previous sentence negator function) before initializing the sentence scores for the next sentence.

At the end of the document tested at block 63 (END OF DOC?) the system decides whether or not there is a next sentence or segment (block 64, NEXT SEG/SENT) to process from step 51. If not, then one performs the following tests and counts:

if the total number of competitors is higher, than the comparison threshold (block 65, COMP?), then the document is not considered in the satisfaction index and the eventual next document is processed (block 47, FIG. 3); else, if the difference between the positive and negative scores of the document is lower than the satisfaction threshold (block 66, SATISF?), then the document is considered as opinionless, else the positive or negative index of the object is incremented by 1 (block 67, INDEX COUNTER) depending on the score of the document.

Various alterations or modifications can be provided alone or in combination. Among others:

the number of references to competitors may be obtained either by considering the occurrences of anti-key subjects as competitor occurrences or by counting separately the occurrences of competitors;

one can force the scores of the document to 0 if the difference between its positive and negative scores is lower than a satisfaction threshold; to obtain the opinionless score of the object, one could either add the number of documents having both negative and positive scores at 0, or calculate the difference between the number of processed documents and the sum of positive and negative scores; and the comparison threshold can concern the difference (in absolute value) between the occurrences of key subjects and anti-key subjects in the document.

Other adjustments or modifications may be provided. For example, one could accept that the current word to be processed might not exactly correspond to one found in the lists, but contain it. One might also first convert each word to the lower case to simplify the word search. Further, the search engine(s) used in the invention for determining if a word is present or not in a list of words is(are) conventional.

An advantage of the present invention is that processing the documents with lists of positive concepts, negative concepts and descriptive properties is faster than a manual evaluation and simplifies the configuration of the system with respect to an automatic evaluation based on artificial neural networks.

Another advantage of the present invention is that it gives better results of the satisfaction index than the known automatic methods. Especially, processing each document sentence after sentence allows taking into account the context of a positive or negative concept.

Another advantage is that the possibility to exclude sentences (and documents) containing anti-key subjects and/or to only take into account sentences containing key-subject(s) improves the viability of the evaluation without notably impairing the simplicity of the system and the speed of the processing.

Another advantage is that processing the document for the key subjects and/or anti-key subjects and for the positive and/or negative concepts during the same run allows determining both if a document is to be taken into account and the satisfaction index of said document within a single sequentially processing pass of said document. Further, it simplifies the program. In particular, it allows combining the results only by multiplying or adding the selection results (key, anti-key) to the satisfaction results (positive, negative).

Another advantage is that allowing ignoring the sentences not comprising a key subject renders the system of the present invention able to evaluate correctly the satisfaction index of a text where some descriptive concepts could be confused with appreciation concepts. Indeed, a classification in negative or positive words may not always be sufficient to obtain a correct evaluation of a document satisfaction index. For example, applied to a movie, without ignoring the sentences only describing the movie, such a classification would give a negative index for a thriller and a positive index for an humor movie, whatever would be the real judgment. Such a classification would come from the fact that the text describing the movie would contain words to be considered as negative, respectively positive, in the context of an appreciation. For example, supposing that "acting" is a key words and that the text is: "The acting is great. The monster was awful". Processing every sentence will lead to a opinionless score ("great" is positive, "awful" is negative). Only taking into account the sentences comprising a key subject allows ignoring the descriptive sentence and leads to a correct positive score of the document.

Another advantage is that the invention provides a very simple method to solve the difficulties in interpreting a sentence with a previous sentence negator.

The configuration options offered to the user may be modified and adapted to the field of use. Implementing the invention with conventional programming techniques and devices, is in the ability of those skilled in the art. The documents to be processed may be previously selected from the data base on the basis of other selection elements. For example, one may use a conventional search engine for pre-selecting a group of documents from the web.

The above description has been made with reference to sentences or segments of sentence. However, more generally, one can divide the text into windows of words which do not correspond to sentences. For example, a window can correspond to a predetermined number of words foregoing and following each occurrence of a key subject. The document can also be subdivided into successive windows containing each the same predetermined number of words. The two foregoing kinds of windows can be combined with anti-key windows corresponding to a predetermined number of words foregoing and following each occurrence of an anti-key subject.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalent thereto.

The invention claimed is:

1. A computer based method for automatically determining an object satisfaction index of an object, among documents contained in at least one local or remote memory storage, the method comprising the steps of:

selecting from the memory storage documents relating to said object based on occurrences in the documents of at least one anti-key subject of the object;

processing each of the selected documents according to the following steps:

subdividing the document into windows of words;

selecting, automatically by a computer, one of said windows if it either does not contain any descriptive property corresponding to at least one anti-key subject of said object, or contains at least one descriptive property corresponding to a key subject of said object and does not contain any descriptive property corresponding to at least one anti-key subject of said object;

processing each selected window to determine a positive or negative score of said window by counting occurrences of positive and negative concepts;

cumulating the scores of the selected windows and calculating said object satisfaction score for the document, the object satisfaction score indicative of a number of occurrences of positive or negative opinions conveyed in relation to the object; and storing in a computer memory data representing the scores and the related windows, and data representing the object satisfaction score for the document;

cumulating the scores of the selected documents by adding said object satisfaction score for the document to a cumulative score only if an absolute value of a difference between the positive and negative scores of the document is higher than a predetermined satisfaction threshold, or is otherwise considered as opinionless and deducing from obtained cumulated scores said object satisfaction index; and outputting a report of the object, the object satisfaction index, and the scores of the related documents;

whereby a trend in people's perception regarding the object can be determined.

2. The computer based method of claim 1, wherein the object is selected from the group consisting of a product, a service, a brand, and an event.

3. A computer based method for automatically determining an object satisfaction index of an object, among documents contained in at least one local or remote memory storage, the method comprising the steps of:

selecting from the memory storage documents relating to said object based on occurrences of at least one anti-key subject of the object;

processing each of the selected documents according to the following steps:

subdividing the document into windows of words;

selecting, automatically by a computer, one of said windows if it either does not contain any descriptive property corresponding to at least one anti-key subject of said object, or contains at least one descriptive property corresponding to a key subject of said object and does not contain any descriptive property corresponding to at least one anti-key subject of said object;

processing each selected window to determine a positive or negative score of said window by counting occurrences of positive and negative concepts;

cumulating the scores of the selected windows and calculating said object satisfaction score for the document, the object satisfaction score indicative of a number of occurrences of positive or negative opinions conveyed in relation to the object; and storing in a computer memory data representing the scores and the related windows, and data representing the object satisfaction score for the document;

counting a number of occurrences of competitor subjects in the document;

cumulating the scores of the selected documents by adding said object satisfaction score for the document to a cumulative score only if said number of competitor subject occurrences is lower than a predetermined comparison threshold and deducing from obtained cumulated scores said object satisfaction index; and outputting a report of the object, the object satisfaction index, and the scores of the related documents;

whereby a trend in people's perception regarding the object can be determined.

4. The computer based method of claim 3, wherein the competitor subjects are part of the anti-key subjects and are counted during said processing step of each selected window.

5. The computer based method of claim 3, wherein the object is selected from the group consisting of a product, a service, a brand, and an event.

* * * * *